US009165250B2

(12) United States Patent
Froelich

(10) Patent No.: US 9,165,250 B2
(45) Date of Patent: Oct. 20, 2015

(54) DYNAMIC INCIDENT RESPONSE

(71) Applicant: Bank of America Corporation, Charlotte, NC (US)

(72) Inventor: Craig Froelich, Thousand Oaks, CA (US)

(73) Assignee: Bank of America Corporation, Charlotte, NC (US)

(*) Notice: Subject to any disclaimer, the term of this patent is extended or adjusted under 35 U.S.C. 154(b) by 358 days.

(21) Appl. No.: 13/753,671

(22) Filed: Jan. 30, 2013

(65) Prior Publication Data

US 2014/0214744 A1 Jul. 31, 2014

(51) Int. Cl.
*G06N 5/02* (2006.01)
*G06Q 10/06* (2012.01)

(52) U.S. Cl.
CPC . *G06N 5/02* (2013.01); *G06Q 10/06* (2013.01)

(58) Field of Classification Search
CPC .............................. G06N 99/005; G06N 5/02
USPC ......................................................... 706/12
See application file for complete search history.

(56) References Cited

U.S. PATENT DOCUMENTS

| | | | |
|---|---|---|---|
| 7,340,594 B2 | 3/2008 | First et al. | |
| 7,571,179 B2 | 8/2009 | Meyers et al. | |
| 8,225,407 B1 * | 7/2012 | Thrower et al. | 726/25 |
| 8,228,176 B2 | 7/2012 | Lewis | |
| 8,280,344 B2 | 10/2012 | O'Reilly | |
| 8,314,683 B2 | 11/2012 | Pfeffer | |
| 2005/0257269 A1 | 11/2005 | Chari et al. | |
| 2006/0212932 A1 | 9/2006 | Patrick et al. | |
| 2007/0103294 A1 | 5/2007 | Bonecutter et al. | |
| 2007/0107041 A1 | 5/2007 | Kayashima et al. | |
| 2009/0105995 A1 | 4/2009 | Harrington et al. | |
| 2009/0164522 A1 | 6/2009 | Fahey | |
| 2009/0276489 A1 | 11/2009 | Ragno et al. | |
| 2009/0284348 A1 * | 11/2009 | Pfeffer | 340/7.3 |
| 2009/0296898 A1 | 12/2009 | Ragno et al. | |
| 2010/0088315 A1 | 4/2010 | Netz et al. | |
| 2010/0141430 A1 | 6/2010 | Steer | |
| 2011/0166869 A1 | 7/2011 | Froelich et al. | |
| 2011/0167011 A1 | 7/2011 | Paltenghe et al. | |
| 2011/0264608 A1 * | 10/2011 | Gonsalves et al. | 706/10 |
| 2012/0030757 A1 | 2/2012 | Baikalov et al. | |
| 2012/0123758 A1 | 5/2012 | Kevan | |
| 2012/0286932 A1 | 11/2012 | Lewis | |

* cited by examiner

*Primary Examiner* — Stanley K Hill
*Assistant Examiner* — Ola Olude Afolabi
(74) *Attorney, Agent, or Firm* — Banner & Witcoff, Ltd.; Michael A. Springs

(57) ABSTRACT

Methods, systems, computer-readable media, and apparatuses for providing dynamic incident response using advanced analytics are presented. In some embodiments, a computing device may determine that an incident has occurred. The computing device then may load a predefined response template that includes parameters for responding to the incident. Subsequently, the computing device may utilize a big data platform to identify one or more potential responders for the incident based on the predefined response template. In some additional embodiments, the computing device also may contact the identified potential responders and subsequently monitor communications by the identified potential responders that are responsive to the contact. The computing device may also update historical interaction data based on the monitoring, and this historical interaction data may be used to subsequently determine the likelihood that at least one potential responder will respond to a future incident.

20 Claims, 6 Drawing Sheets

| | |
|---|---|
| 300 | INCIDENT RESPONSE TEMPLATE |
| 305 | INCIDENT TYPE |
| 310 | NECESSARY SKILL(S) |
| 315 | PREFERRED SKILL(S) |
| 320 | NECESSARY SECURITY CLEARANCE(S) |
| 325 | PREFERRED SECURITY CLEARANCE(S) |
| 330 | NECESSARY LEVEL(S) |
| 335 | PREFERRED LEVEL(S) |
| 340 | PREFERRED INDIVIDUAL(S) |
| 345 | PREFERRED TEAM(S) |

FIG. 3

DYNAMIC INCIDENT RESPONSE

BACKGROUND

Aspects of the disclosure relate to computer hardware and software. In particular, one or more aspects of the disclosure generally relate to computer hardware and software that can be used by an organization, such as a financial institution, to provide dynamic incident response using advanced analytics.

In some instances, a large organization, such as a financial institution, might need to respond to an incident that has occurred or that may soon occur. Various types of incidents might warrant such a response, including cyber security incidents, physical security incidents, disaster recovery incidents, and other types of incidents. While the ways in which an organization may respond to a particular incident can vary based on a number of factors which may be specific to the particular incident, the organization may, in many circumstances, want to assemble and/or coordinate a team of people to develop and execute the organization's response to the incident.

Various aspects of the disclosure provide more convenient, functional, and easy-to-use tools and technologies that can be used by an organization in these and other circumstances.

SUMMARY

Certain embodiments are described that enable an organization, particularly a large company or other large organization, to respond to incidents more efficiently and with an optimal group of resources. In particular, in some embodiments, a "big data" platform may be deployed and utilized to identify the appropriate individuals and/or teams to respond to a particular incident, and such a platform may further be used to contact these individuals and/or teams to coordinate the organization's response to the incident.

As discussed in greater detail below, the big data platform may be an information storage and management system that can be used by the organization to store, organize, maintain, and update many different kinds of information that is produced, used, and/or otherwise associated with the organization. This information can include high-volume data that is generated and/or updated in real-time by the big data platform, such as access information (e.g., records of personnel accessing different physical buildings or logging into certain computer systems), availability information (e.g., calendar availability information, travel itineraries, and other types of availability information), administrative information (e.g., human resources records, personnel background information, and other types of administrative information), communication information (e.g., contents of email messages and telephone messages), and work product information (e.g., presentations, memoranda, and the like). In addition, the big data platform may leverage and/or enable a number of different algorithms that can be used to process and/or analyze any and/or all of this information.

By leveraging such a big data platform to identify individuals and/or teams as potential responders for an incident and to coordinate an organization's response to the incident, the organization can respond to such an incident more quickly, resources can be used in a more optimal and efficient manner, and any desired changes in the organization's response can be determined and implemented in real-time as the situation surrounding the incident unfolds.

In some embodiments discussed below, a computing device may determine that an incident has occurred. Subsequently, the computing device may load a predefined response template that includes parameters for responding to the incident. Then, the computing device may utilize a big data platform and/or one or more algorithmic processes to identify one or more potential responders for the incident based on the predefined response template.

In some arrangements, determining that the incident has occurred may include determining that one or more "causal events" have occurred prior to an occurrence of a moment of impact. Additionally or alternatively, determining that the incident has occurred may include classifying the incident.

In other arrangements, the predefined response template may define one or more necessary skills for a potential responder, one or more preferred skills for the potential responder, one or more necessary security clearances for the potential responder, one or more preferred security clearances for the potential responder, one or more necessary associations for the potential responder, and one or more preferred associations for the potential responder.

In some arrangements, utilizing the big data platform to identify the one or more potential responders may include determining whether at least one potential responder is qualified to respond to the incident. Additionally or alternatively, utilizing the big data platform to identify the one or more potential responders may include determining, for at least one potential responder, a likelihood that the at least one potential responder will respond to the incident. Additionally or alternatively, utilizing the big data platform to identify the one or more potential responders may include determining, for at least one potential responder, an optimal way to contact the at least one potential responder.

In other arrangements, utilizing the big data platform to identify the one or more potential responders may include calculating, for each of the identified potential responders, a qualification score, a likelihood of response score, and a location confidence score. Then, for each of the identified potential responders, an aggregate score may be calculated based on the corresponding qualification score, likelihood of response score, and location confidence score. Subsequently, the identified potential responders may be ranked based on the aggregate score calculated for each of the identified potential responders.

In some arrangements, the computing device also may be configured to contact the identified potential responders. Additionally or alternatively, the computing device may be configured to monitor communications by the identified potential responders that are responsive to the contact. The computing device may be configured to subsequently update historical interaction data based on the monitoring, and the historical interaction data can be used by the computing device in determining a likelihood that at least one potential responder will respond to a future incident.

BRIEF DESCRIPTION OF THE DRAWINGS

The present disclosure is illustrated by way of example and not limited in the accompanying figures in which like reference numerals indicate similar elements and in which:

FIG. 3 depicts an example of an incident response template according to one or more illustrative aspects of the disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As noted above, certain embodiments are discussed herein that relate to using a big data platform in providing dynamic incident response functionalities. Before discussing these concepts in greater detail, however, an example of a computing device that can be used in implementing various aspects of the disclosure, as well as an example of an operating environment in which various embodiments can be implemented, will first be described with respect to FIGS. 1A and 1B.

Figure 1A:
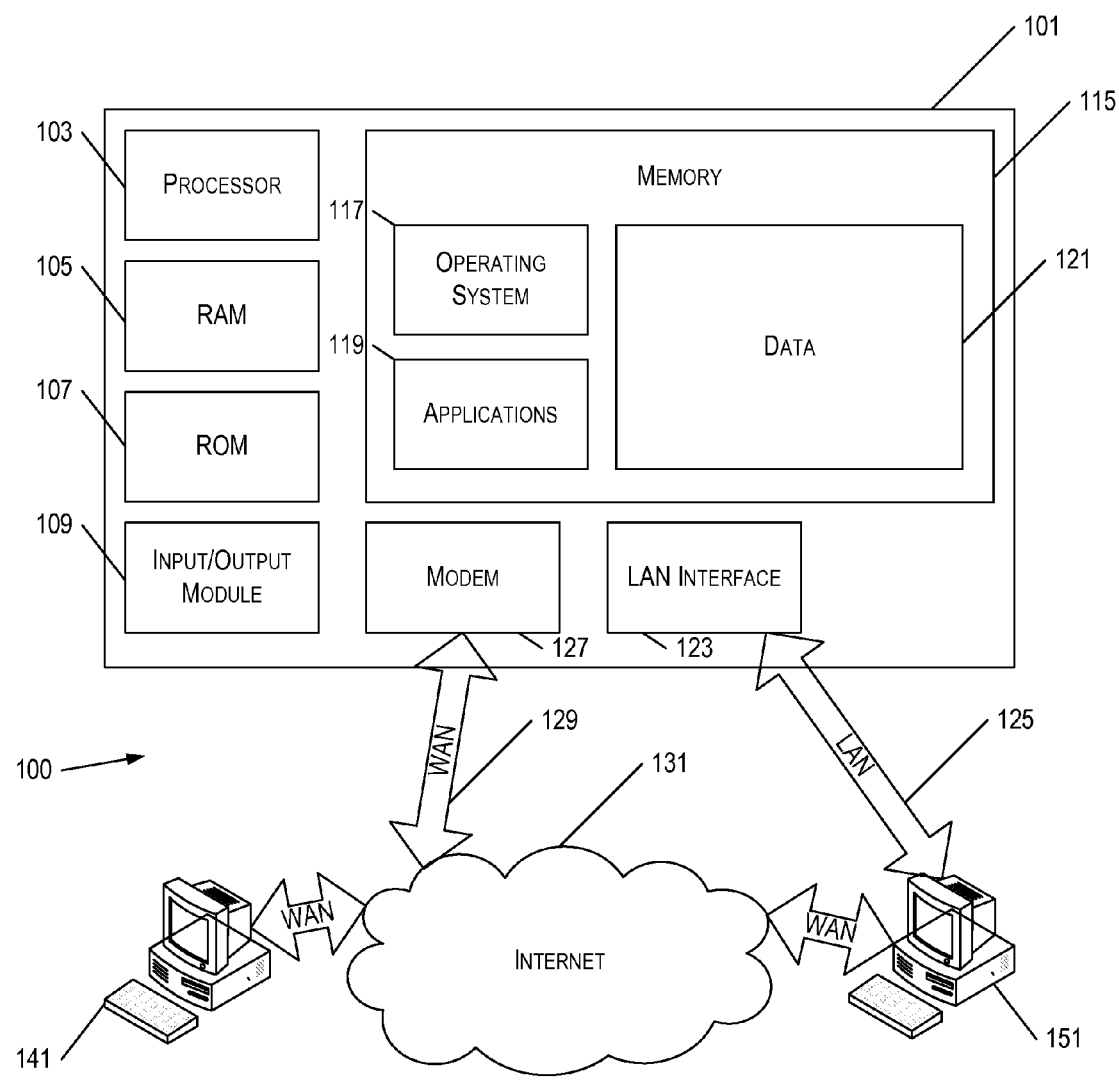
FIG. 1A illustrates an example operating environment in which various aspects of the disclosure may be implemented.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and so on) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
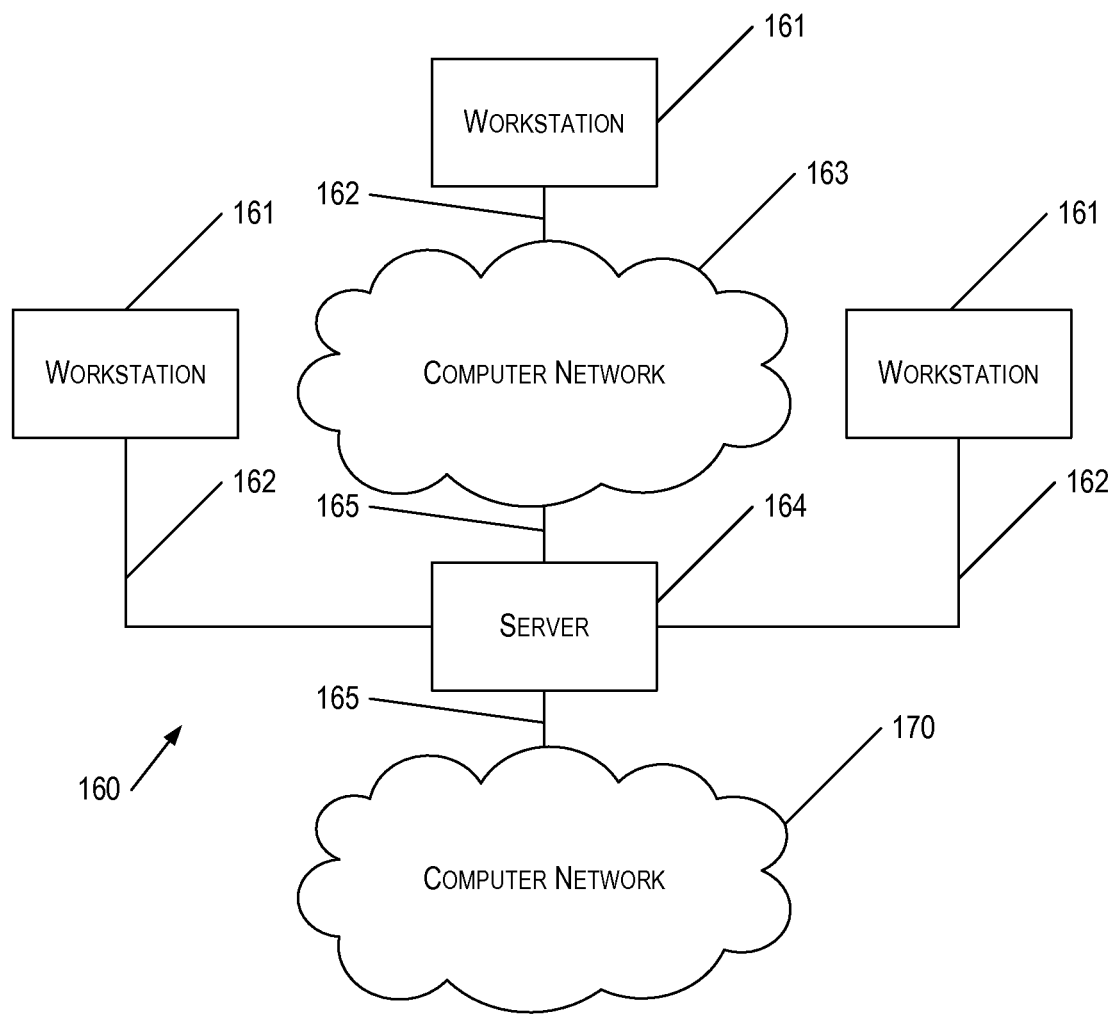
FIG. 1B illustrates another example operating environment in which various aspects of the disclosure may be implemented.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and/or the like.

Having described an example of a computing device that can be used in implementing various aspects of the disclosure and an operating environment in which various aspects of the disclosure can be implemented, several embodiments will now be discussed in greater detail.

Figure 2:
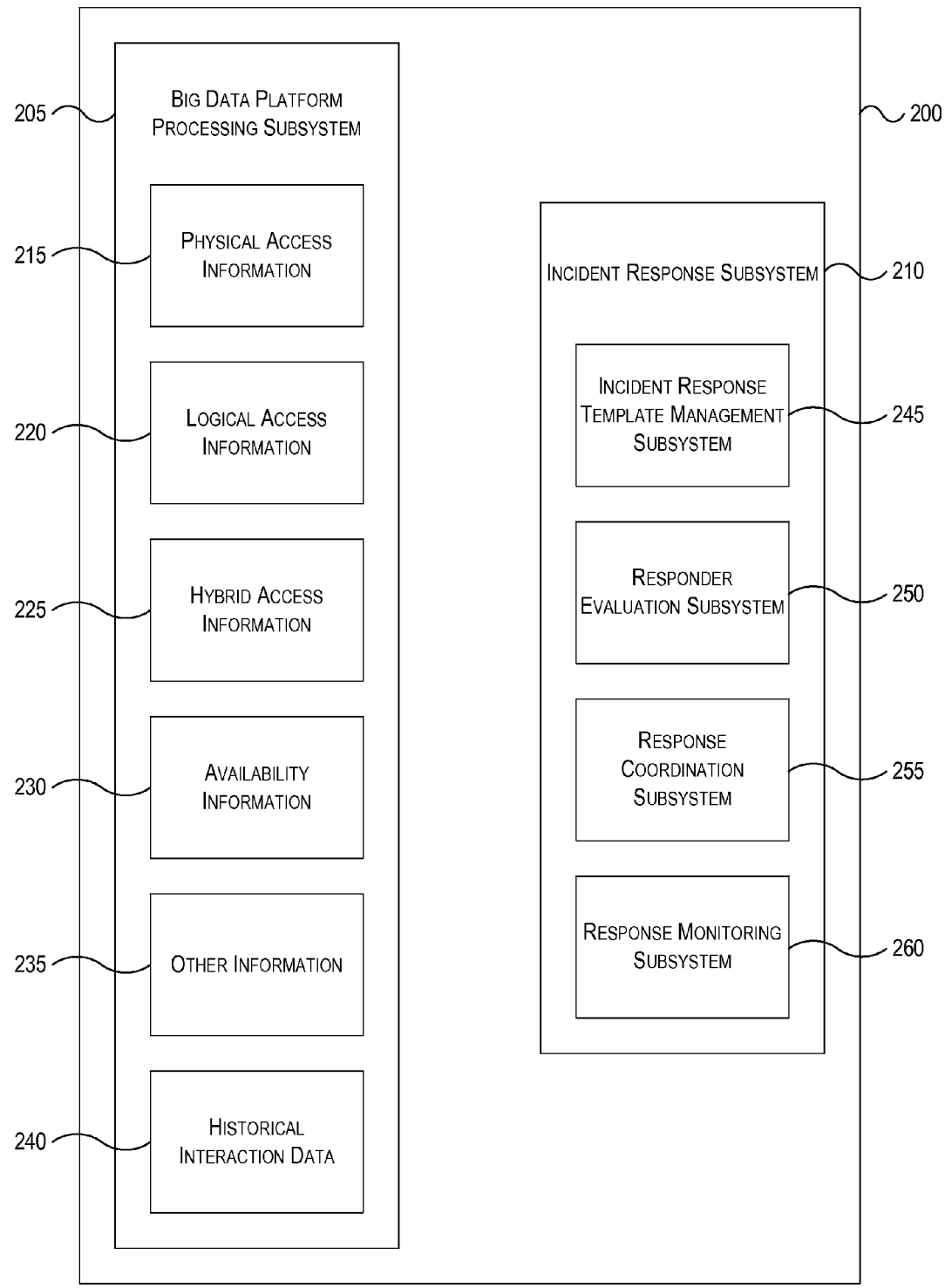
FIG. 2 depicts an example of a dynamic incident response system according to one or more illustrative aspects of the disclosure.

FIG. 2 depicts an example of a dynamic incident response system 200 according to one or more illustrative aspects of the disclosure. As seen in FIG. 2, system 200 may include a number of subsystems, including a big data platform processing subsystem 205 and an incident response subsystem 210, which in turn may include one or more additional subsystems and/or various types of information. In some embodiments, system 200 and/or one or more of the subsystems included in system 200 may be implemented by and/or in one or more computing devices, such as computing device 101. Additionally or alternatively, system 200 and/or one or more of the subsystems included in system 200 may be embodied in a computer readable medium (e.g., as instructions and/or information stored in such a computer readable medium). In some arrangements, system 200 may be implemented in a single computer system, while in other arrangements, the various subsystems of system 200 may be implemented in different computer systems that are communicatively coupled (e.g., via one or more networks) to provide some or all of the functionalities discussed herein.

As illustrated in FIG. 2, system 200 can include a big data platform processing subsystem 205 and an incident response subsystem 210. In some embodiments, big data platform processing subsystem 205 may provide data storage and/or information management services to an organization, such as a financial institution, that may be implementing various aspects of the disclosure. For example, big data platform processing subsystem 205 may provide a big data platform that is configured to store large amounts of information associated with such an organization. The big data platform may be further configured to update this information in real time as changes occur.

In some instances, the big data platform (e.g., provided by big data platform processing subsystem 205) may be a comprehensive information management solution for the organization and may operate at an enterprise level, such that all electronic information possessed by the organization is stored by and/or available to the big data platform for any and all purposes, including indexing and searching. By storing and/or maintaining such large amounts of information in this way, advanced analytics and semantic searching may be enabled, and the analysis that may be performed on this information, as well as the conclusions that may be arrived at, may accurately reflect the actual large data sets, rather than merely reflecting smaller representative samples of such data sets.

In some arrangements, big data platform processing subsystem 205 may be implemented in one or more servers. The servers may, for instance, be one or more physical servers that are operated by an organization implementing one or more aspects of the disclosure, one or more virtual servers operated by a cloud service provider and made available to the organization, and/or combinations thereof.

In some embodiments, big data platform processing subsystem 205 may provide and/or access a number of different data sources, and each of these data sources may store, maintain, and/or provide various types of information. For example, big data platform processing subsystem 205 may provide and/or access one or more data sources that store, maintain, and/or provide physical access information 215, logical access information 220, hybrid access information 225, availability information 230, other information 235, and/or historical interaction data 240. While these types of information and corresponding data sources are discussed here as examples of the types of information and data sources that may be used with big data platform processing subsystem 205 in some embodiments, other types of information and data sources may similarly be used with big data platform processing subsystem 205 in other embodiments instead of and/or in addition the types of information and data sources discussed here.

In some arrangements, physical access information 215 may include records that reflect and/or otherwise describe visits by employees and other personnel associated with the organization to certain physical sites, such as office buildings, data centers, and other physical spaces that are owned and/or controlled by the organization. Such records may, for instance, include badge records (e.g., which may indicate that certain personnel and/or certain access badges entered certain buildings and/or other spaces at certain times), video surveillance records (e.g., which may capture images and/or video that can be processing using facial recognition techniques to identify certain personnel who were and/or are present at certain locations), and/or other records that may be indicative of physical access to a particular location by a particular person.

In some arrangements, logical access information 220 may include records that reflect and/or otherwise describe virtual access by employees and other personnel to computer systems and other electronic systems used by the organization. For example, such records may include computer login records (e.g., which may indicate that certain personnel logged into and/or otherwise access certain computer systems at certain times), telephone usage records (e.g., which may indicate that certain personnel utilized certain telephone systems and/or services at certain times), and/or other records that may be indicative of logical access to a particular system by a particular person.

In some arrangements, hybrid access information 225 may include records that reflect virtual access by employees and other personnel to mobile devices and other systems which may vary in location. For example, hybrid access information 225 may include location information provided by mobile devices connected to organization servers (e.g., GPS-derived position information) and/or other information that may be analyzed to determine mobile device position (e.g., VPN/proxy information, WiFi signal information, and so on).

In some arrangements, availability information 230 may include records that reflect meeting schedules, travel schedules, and other availability information for employees and other personnel associated with the organization. For example, availability information 230 may include electronic calendar information (e.g., obtained from calendar software that may be used by various employees and other personnel associated with the organization), travel itinerary information (e.g., obtained from itinerary management software and/or other electronic records that may be used to book and/or coordinate travel by various employees and other personnel associated with the organization), and other records that may be indicative of where a particular individual is located and/or whether a particular individual is available or unavailable at a particular time.

In some arrangements, other information 235 may include one or more other types of data that may be generated by, used by, and/or otherwise associated with the organization. For example, other information 235 may include communications information, which may, for instance, include contents of email messages sent to and/or from various personnel associated with the organization, audio contents of telephone messages sent to and/or from such personnel, and/or other types of information associated with communications in and/or out of the organization. Additionally or alternatively, other information 235 may include administrative information, which may, for instance, include records generated and/or maintained by human resources personnel that relate to the qualifications, experience, seniority level, and/or security access clearance level of various employees and/or other personnel associated with the organization. Additionally or alternatively, other information 235 may include work product information, which may, for instance, include memoranda, presentations, and/or other types of substantive work product that may have been created, accessed, and/or otherwise used by employees and/or other personnel associated with the organization. While these types of information are discussed here as examples of the types of information that may be included in other information 235 in some embodiments, additional and/or alternative types of information may similarly be included in other information 235 in other embodiments instead of and/or in addition to those discussed here. For instance, in at least one arrangement, other information 235 may additional include web browser history information for employees and other personnel associated with the organization that may be implementing various aspects of the disclosure.

In some arrangements, historical interaction data 240 may include records that reflect a particular individual or team's past contact with the system 200 in an incident response context. For example, these records may indicate whether or not a person previously responded to the system 200 when the system 200 attempted to contact the person in coordinating a response to a previous incident. Such records may, for instance, reflect how many times the system attempted to contact the person in connection with the previous incident, as well as how quickly the person responded to the system. Additionally or alternatively, these records may, for instance, reflect whether other personnel who responded to the incident found the particular individual's contribution to be valuable, and if so, to what extent the individual's contribution was considered to be valuable. In additional and/or alternative arrangements, historical interaction data 240 may reflect any other aspects of an individual's previous interaction(s) with system 200, as may be desired.

As noted above, in addition to including a big data platform processing subsystem 205, system 200 also may include an incident response subsystem 210. As shown in FIG. 2, incident response subsystem 210 also may include a number of subsystems, including an incident response template management subsystem 245, a responder evaluation subsystem 250, a response coordination subsystem 255, and a response monitoring subsystem 260. Each of these subsystems will now be discussed in greater detail.

In some embodiments, incident response template management subsystem 245 may store and/or maintain information related to one or more templates that may be used by the system in responding to a number of different kinds of incidents. Each of these templates may define typical response parameters for a certain type of incident, and in any given instance, the system may load an appropriate template depending on the incident that the system is responding to.

For example, an incident response template may define, for a particular type of incident, the necessary and/or preferred skills of potential responders, the necessary and/or preferred security clearance of potential responders, the necessary and/or preferred title and/or seniority level of potential responders, as well as the identities of any preferred individuals and/or teams for responding to the incident. While these types of information are listed here as examples of the types of information that may be included in an incident response template in some embodiments, other types of information may similarly be included in an incident response template in other embodiments instead of and/or in addition to those types of information listed here. An example of an incident response template will be discussed in greater detail below with respect to FIG. 3.

Referring again to FIG. 2, responder evaluation subsystem 250 may, in some embodiments, be configured to communicate with and/or otherwise utilize the big data platform processing subsystem 205 to identify potential responders for an incident, based on an incident response template that has been loaded (e.g., by the incident response template management subsystem 245). As will be discussed in greater detail below, utilizing a big data platform (e.g., the big data platform provided by big data platform processing subsystem 205) in this way may include determining whether certain individuals and/or teams are appropriate to respond to the particular incident (e.g., by comparing information about the individuals and/or teams obtained from the big data platform with the parameters defined in the incident response template being used), determining whether certain individuals and/or teams are likely to respond to the particular incident (e.g., based on historical interaction data obtained from the big data platform), and/or determining how best to contact certain individuals and/or teams (e.g., based on availability information and/or location information obtained from the big data platform).

In some embodiments, response coordination subsystem 255 may be configured to contact individuals and/or teams who may be identified as potential responders (e.g., by responder evaluation subsystem 250). For example, response coordination subsystem 255 may be configured to initiate telephone calls and/or conference calls to potential responders, send electronic messages (e.g., email messages, text messages, and/or other types of electronic messages) to potential responders, and/or otherwise communicate with potential responders. By communicating with potential responders in these and/or other ways, response coordination subsystem 255 may enable system 200 to initiate and/or coordinate an organization's response to a particular incident by engaging the appropriate teams and/or personnel to handle the response.

In some embodiments, response monitoring subsystem 260 may be configured to monitor interactions with potential responders (e.g., in response to communications initiated by response coordination subsystem 255) and may be further configured to update historical interaction data based on such monitoring. For example, based on a certain individual's or team's response to one or more communications initiated by response coordination subsystem 255, response monitoring subsystem 260 may create and/or update historical interaction data about the particular individual and/or team, and further may store such historical interaction data for future use by the system. In some arrangements, such historical interaction data may, for instance, be stored by big data platform processing subsystem 205 as part of historical interaction data 240. Additionally or alternatively, this historical interaction data may, for instance, be subsequently used by the system in determining whether a certain individual and/or team is likely to respond to an incident, and/or to what extent such a response may be likely.

FIG. 3 depicts an example of an incident response template 300 according to one or more illustrative aspects of the disclosure. As seen in FIG. 3, incident response template 300 may comprise a data structure that includes a number of different fields in which various kinds of information can be stored and/or otherwise maintained. In addition, the information included in these fields may define necessary and/or preferred parameters for an organization's response to a particular type of incident. In some embodiments, a system implementing various aspects of the disclosure (e.g., system 200) may store and/or maintain a number of incident response templates, and each of these templates may be a unique instance of the data structure represented by incident response template 300.

In one or more arrangements, incident response template 300 may include an incident type field 305. Incident type field 305 may, for instance, include information identifying a type of incident to which the incident response template applies. Some examples of different types of incidents for which incident response templates may be defined include cyber security incidents, physical security incidents, and disaster recovery incidents. In additional and/or alternative embodiments, one or more incident response templates may similarly be defined for one or more other types of incidents.

In one or more arrangements, incident response template 300 also may include a necessary skills field 310 and a preferred skills field 315. Necessary skills field 310 may, for instance, include information that specifies one or more necessary skills and/or a minimum level of capability for a potential responder to the incident for which the particular incident response template applies. Preferred skills field 315 may, for instance, include information that specifies one or more preferred skills for a potential responder. In some instances, an individual or team may, for example, be determined to be a potential responder to an incident if they possess one or more necessary skills but not one or more preferred skills, but such an individual or team may be considered a more preferred responder to the incident if they also possess the one or preferred skills in addition to the one or more necessary skills.

In one or more arrangements, incident response template 300 also may include a necessary security clearances field 320 and a preferred security clearances field 325. Necessary security clearances field 320 may, for instance, include information that specifies one or more necessary security clearances and/or minimum security access levels for a potential responder to the incident for which the particular incident response template applies. Preferred security clearances field 325 may, for instance, include information that specifies one or more preferred security clearances for a potential responder. In some instances, an individual or team may, for example, be determined to be a potential responder to an incident if they possess one or more necessary security clearances (even if they do not possess one or more preferred security clearances), but such an individual or team may be considered to be a more preferred responder to the incident if they also possess the one or more preferred security clearances in addition to the one or more necessary security clearances.

In one or more arrangements, incident response template 300 also may include a necessary seniority level field 330 and a preferred seniority level field 335. Necessary seniority level field 330 may, for instance, include information that specifies a minimum seniority level and/or title (e.g., within the organization) needed for a potential responder to the incident for which the particular incident response template applies. Preferred seniority level field 335 may, for instance, include information specifying one or more preferred seniority levels and/or titles for a potential responder. In some instances, an individual or team may, for example, be determined to be a potential responder to an incident if they possess the minimum seniority level and/or title needed to be a potential responder, but such an individual or team may be considered to be a more preferred responder to the incident if they possess a higher, preferred seniority level and/or title.

In one or more arrangements, incident response template 300 also may include a preferred individuals field 340 and a preferred teams field 345. Preferred individuals field 340 may, for instance, include information that specifies one or more individuals (e.g., within the organization) who are to be considered preferred responders for the incident to which the particular incident response template applies. Similarly, preferred teams field 345 may, for instance, include information that specifies one or more teams (e.g., within the organization) who are to be considered preferred responders for the incident to which the particular incident response template applies.

While the examples discussed above illustrate a number of different fields that may be included in an incident response template in some embodiments, an incident response template may, in other embodiments, include one or more additional and/or alternative fields (e.g., in addition to and/or instead of those fields discussed above).

Figure 4:
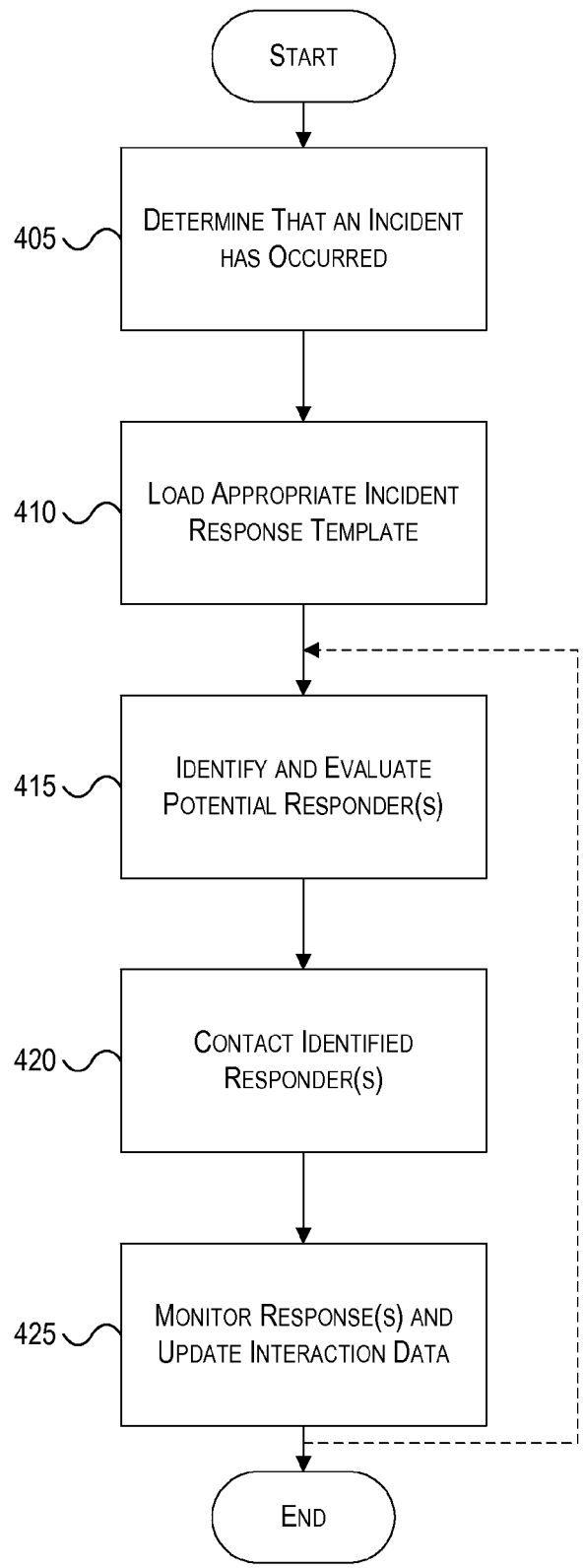
FIG. 4 depicts an example method of providing dynamic incident response functionalities using advanced analytics according to one or more illustrative aspects of the disclosure.

FIG. 4 depicts an example method of providing dynamic incident response functionalities using advanced analytics according to one or more illustrative aspects of the disclosure. In some embodiments, any and/or all of the steps of the example method illustrated in FIG. 4 may be performed by one or more computing devices, such as computing device 101 and/or system 200. Additionally or alternatively, any and/or all of the steps of the example method illustrated in FIG. 4 may be embodied in computer executable instructions stored in a computer readable medium, such as a non-transitory computer readable memory.

In step 405, a computing device (e.g., computing device 101, system 200, and/or the like) may determine that an incident has occurred. In some instances, the computing device may automatically determine that the incident has occurred based on analysis performed by the computing device, while in other instances, the computing device may determine that the incident has occurred based on input received by the computing device. Such input can, in some instances, be received from another system or computing device, and in other instances, such input can be received as user input from a user of the computing device.

In some embodiments, determining that an incident has occurred may include identifying one or more causal events prior to a moment of impact associated with the incident. For example, it may be determined (e.g., by the computing device) that an incident has occurred even before a significant impact associated with the incident has been felt, simply based on the occurrence of one or more causal events (e.g., small scale events leading up to a more significant moment of impact). One example of this is a cyber security incident that involves a denial of service attack against one or more computer systems of the organization, and the occurrence of the incident is determined and/or otherwise identified as initial data packets are received by the computer systems but before the brunt of the attack is received and/or before any disruption in services occurs.

In some embodiments, determining that an incident has occurred may include classifying the incident. For example, the computing device (e.g., computing device 101, system 200, and/or the like) may classify the incident as being of a certain type (e.g., a cyber security incident, a physical security incident, a disaster recovery incident, and/or any other type of incident), as this may facilitate loading of an appropriate incident response template, as discussed in greater detail below. In some instances, classifying the incident may be based on user input that specifies that the incident is of a certain type, while in other instances, the incident may be classified automatically by the system (e.g., system 200) based on data that is associated with the incident and available to the system.

In step 410, the computing device (e.g., computing device 101, system 200, and/or the like) may load an appropriate incident response template. In some instances, loading an appropriate incident response template can include selecting an incident response template from a plurality of available incident response templates based on the type of incident identified in step 405. In this way, the incident response template loaded in step 410 may depend on the incident and/or the causal events that were previously identified (e.g., by the computing device), as well as the classification of the incident that may have been performed in step 405.

As discussed above, the incident response template may include one or more parameters for responding to the incident. For example, the incident response template loaded in step 410 may be specific to the type of incident that has occurred (e.g., as may be determined in step 405) and may define various characteristics of potential responders for the incident. Some characteristics that may be taken into account by the incident response template include the necessary and/or preferred skills of potential responders, the necessary and/or preferred security clearance of potential responders, the necessary and/or preferred seniority level of potential responders, and/or other factors. In some instances, the incident response template may additionally and/or alternatively specify one or more preferred individuals and/or teams (e.g., by name or by another unique identifier) to be considered potential responders for the incident.

In step 415, the computing device (e.g., computing device 101, system 200, and/or the like) may identify and evaluate one or more potential responders. In particular, in step 415, the computing device may utilize a big data platform (e.g., the big data platform provided by big data platform processing subsystem 205) to identify one or more potential responders for the incident (e.g., the incident identified in step 405) based on the predefined response template (e.g., the incident response template loaded in step 410). For example, the computing device may utilize the big data platform to identify certain individuals and/or teams (e.g., within the organization) who possess the necessary and/or preferred characteristics specified in the incident response template that was loaded in step 410.

In some embodiments, utilizing a big data platform to identify potential responders may include determining whether a particular person and/or a particular team is qualified to respond to the incident. For example, the computing device may identify one or more potential responders by utilizing the big data platform to determine that one or more particular people and/or teams are qualified to respond to the incident. In this way, determining whether a particular person or team is qualified to respond to an incident may be based on current, comprehensive data sets maintained by the big data platform. Such data sets may, for instance, include human resources records, employee work product, email contents, and/or other information, as discussed above. Any and/or all of this information (e.g., the human resources records, employee work product, email contents, and/or other information obtained from the data sets maintained by the big data platform) may be analyzed and/or otherwise used by the computing device in determining whether a particular person or team is qualified to respond to an incident.

In some embodiments, utilizing a big data platform to identify potential responders may include determining whether a particular person and/or a particular team is likely to respond to the incident. For example, the computing device may identify one or more potential responders by utilizing the big data platform to determine that one or more particular people and/or teams are likely to respond to the incident and/or likely to respond to a request (e.g., generated or caused to be generated by the computing device) that they respond to the incident. In some instances, determining whether a particular person and/or a particular team is likely to respond to the incident may include calculating, estimating, and/or otherwise determining a response likelihood value (which may also be referred to as a "likelihood of response score") for the particular person and/or the particular team, where the response likelihood value numerically represents how likely it is that the particular person and/or team will respond to the incident. These response likelihood values may, for instance, be calculated for each of the potential responders and may subsequently be compared (e.g., by the computing device), as discussed below. In some instances, the response likelihood value for a particular person and/or a particular team may be based on historical interaction data, availability and/or location information, and/or other information, and any and/or all of this information may be obtained (e.g., by the computing device) from the big data platform.

In some embodiments, utilizing a big data platform to identify potential responders may include determining an optimal way of contacting a particular person and/or a particular team. For example, the way(s) in which a particular person and/or a particular team can be contacted may be a factor in determining whether one potential responder is more preferable than another, and by determining the optimal way of contacting each potential responder, the various potential responders may be compared on the basis of how such responders can be reached. In some instances, determining the optimal way of contacting a particular person and/or a particular team may be based on availability and/or location information, which may include physical access information (e.g., badge records), logical access information (e.g., computer login records), and/or other information (e.g., video and/or images captured by surveillance cameras, telephone records, mobile device information, GPS information, proxy information, and so on). Any and/or all of this information may be obtained (e.g., by the computing device) from the big data platform to facilitate determining the optimal way of contacting a particular person or team.

In some instances, determining the optimal way of contacting a particular person and/or a particular team may include generating a call tree for contacting the particular person and/or the particular team. Generating such a call tree may, for instance, be based on information included in and/or obtained from the big data platform. For example, in determining the optimal way of contacting a particular person and/or team, the various different ways of contacting the particular person and/or team may be evaluated, and confidence values may be determined (e.g., based on information obtained from the big data platform) and assigned to each of the different ways that the person may be contacted. In an instance in which different confidence values are determined for different modes of contacting the particular person and/or team (e.g., because the computing device may have different levels of confidence in the particular person and/or team being reachable at a particular device and/or at a particular location), then the different ways of contacting the particular person and/or team may be ranked according to their corresponding confidence value, and this ranking may define a call tree that can be used in reaching the particular person and/or team.

In some embodiments, utilizing a big data platform to identify potential responders may include calculating, for each person and/or team that may be considered a potential responder, a qualification score, a likelihood of response score, and a location confidence score. Based on these scores, an aggregate score may be determined for each potential responder, and any and/or all of the potential responders may subsequently be ranked according to their corresponding aggregate score. In some instances, the qualification score may be a numerical representation of how qualified a particular potential responder is to respond to the particular incident. Such a qualification score may, for instance, be calculated in the same way that it may be determined whether a particular person and/or team is qualified to respond to a particular incident, as discussed above. Likewise, a likelihood of response score for a particular person or team considered to be a potential responder may be calculated similar to how the response likelihood value may be calculated for a particular person or team, as discussed above. In addition, the location confidence score for a particular person or team considered to be a potential responder may be a numerical representation of how likely it is that the particular person or team can be reached in a particular way and/or at a particular location. Calculating such a location confidence score may thus be similar to determining a confidence value (e.g., in generating a call tree), as discussed above.

In step 420, one or more of the potential responders (e.g., identified in step 415) may be contacted. For example, in step 420, the computing device (e.g., computing device 101, system 200, and/or the like) may attempt to contact one or more of the potential responders based on the identification and evaluation performed in step 415. In some instances, potential responders may be contacted in accordance with any priority ranking and/or preferences that were determined and/or considered as part of such identification and evaluation. In attempting to contact the one or more potential responders, the computing device may initiate one or more telephone calls, send one or more email messages and/or text messages, and/or otherwise initiate communications with the one or more potential responders.

In step 425, one or more responses by the potential responders (e.g., to the contact initiated in step 420) may be monitored, and historical interaction data may be updated accordingly. For example, in step 425, as and/or after the one or more potential responders are contacted in step 420, the computing device may determine whether each of the potential responders responded to each corresponding attempt at contact, and, if they did respond to a particular attempt at contact, how much time elapsed between the device's attempt at contact and the particular potential responder's response to the attempt at contact. Based on this analysis, the computing device may update historical interaction data (e.g., historical interaction data 240). As discussed above, by updating such historical interaction data, the computing device may adjust and/or otherwise affect the manner in which future attempts at reaching certain individuals and/or teams are carried out. For example, based on the responsiveness (or unresponsiveness) of certain individuals and/or teams, as reflected by the historical interaction data, such individuals and/or teams may be given a higher (or lower) priority ranking when potential responders are identified and evaluated (e.g., in step 415), and this may, in turn, affect whether and/or in what order such individuals and/or teams are contacted in connection with a future incident.

In some instances, execution of the method then may return to step 415 and one or more potential responders may be reevaluated and/or new potential responders may be identified and/or evaluated. Such reevaluation and/or identification may be based on the monitoring performed in step 425. In some instances, these steps may continue to be executed in a loop (e.g., until it is determined that the incident has been resolved and/or an appropriate number of potential responders have been reached and are addressing the incident). Additionally or alternatively, execution of the method may subsequently end.

Figure 5:
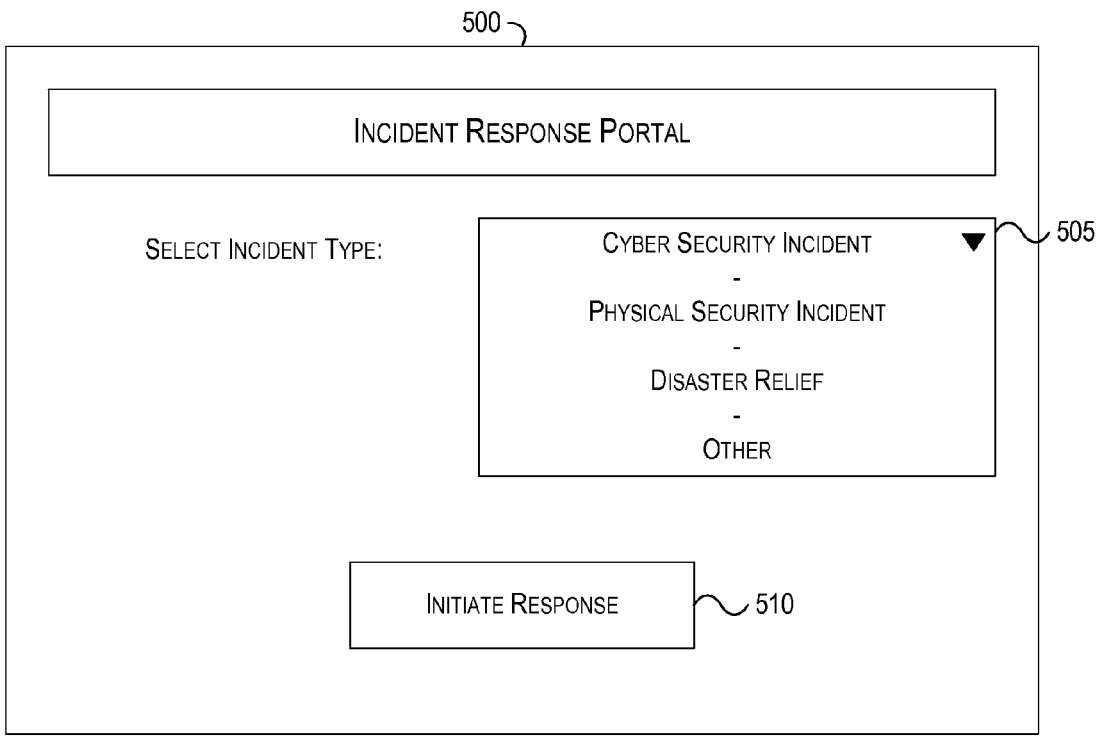
FIG. 5 depicts an example of a user interface for initiating an incident response according to one or more illustrative aspects of the disclosure.

FIG. 5 depicts an example of a user interface 500 for initiating an incident response according to one or more illustrative aspects of the disclosure. As seen in FIG. 5, user interface 500 may include an incident response portal and may be displayed by a computing device (e.g., computing device 101, system 200, and/or the like) to facilitate user interaction with one or more of the methods and/or method steps discussed above. In one or more arrangements, user interface 500 may include an incident selection field 505, which may allow a user to select between different types of incidents with respect to which an incident response process should be initiated. Additionally or alternatively, user interface 500 may include an initiate response button 510, which may, for example, allow a user to initiate such an incident response process. In some instances, user selection of the initiate response button 510 may, for example, cause the computing device displaying user interface 500 to begin execution of the example method discussed above with respect to FIG. 4.

Figure 6:
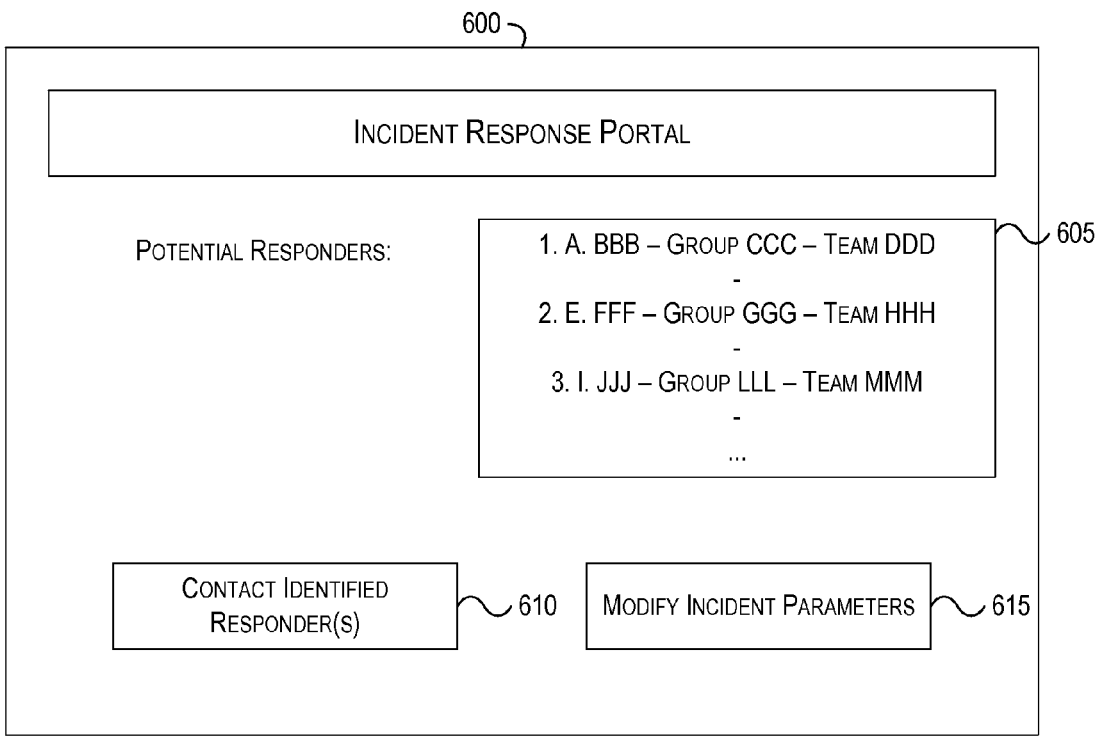
FIG. 6 depicts an example of a user interface for contacting potential responders and modifying incident response parameters according to one or more illustrative aspects of the disclosure.

FIG. 6 depicts an example of a user interface for contacting potential responders and modifying incident response parameters according to one or more illustrative aspects of the disclosure. As seen in FIG. 6, user interface 600 may include another screen of the incident response portal discussed above and similarly may be displayed by a computing device (e.g., computing device 101, system 200, and/or the like) to facilitate user interaction with some of the method steps discussed above. For example, user interface 600 may, in some arrangements, include a potential responders field 605, in which one or more potential responders identified and/or evaluated (e.g., by the computing device during an incident response process) may be displayed. In some instances, potential responders field 605 may show a ranked list of potential responders that includes the names of such responders and/or other information associated with such responders (e.g., contact information, availability information, team membership, qualifications, security clearance level, seniority level, and so on). Any and/or all of this information may, for instance, be maintained by and/or obtained from the big data platform.

In some arrangements, user interface 600 also may include a contact identified responders button 610 and a modify incident parameters button 615. The contact identified responders button 610 may, for example, allow a user to manually initiate an attempt (e.g., by the computing device) at contacting one or more of the potential responders listed in potential responders field 605. In some instances, this manual initiation of an attempt at contacting one or more potential responders may occur instead of and/or in addition to an automatic attempt at contacting the potential responders (which may occur during execution of the method discussed above with respect to FIG. 4). Additionally or alternatively, the modify incident parameters button 615 may, for example, allow a user to change one or more parameters of the incident for which the incident response process has been initiated. For instance, using the modify incident parameters button 615, a user may be able to change the type of incident being responded to from a physical security incident to a disaster recovery incident. Such a change may, for instance, cause reevaluation of the potential responders and/or re-execution of the incident response process discussed above.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A computing device, comprising:
   at least one processor; and
   memory storing computer readable instructions that, when executed by the at least one processor, cause the computing device to:
   determine that a security incident has occurred, the security incident being a physical security incident or a cyber security incident;
   load a predefined response template, the predefined response template comprising a plurality of parameters for responding to the security incident;
   utilize a data platform to identify one or more potential responders for the security incident based on the predefined response template, wherein the data platform maintains physical access information, logical access information, hybrid access information, and availability information for an organization, and wherein the one or more potential responders are associated with the organization;
   contact the one or more potential responders for the security incident identified based on the predefined response template;
   monitor communications by the one or more potential responders for the security incident identified based on the predefined response template, the monitored communications being responsive to the contact;
   update historical interaction data maintained by the data platform, based on the monitored communications by the one or more potential responders for the security incident identified based on the predefined response template; and
   calculate, based on the historical interaction data maintained by the data platform, a response likelihood value for at least one potential responder of the one or more potential responders for the security incident identified based on the predefined response template, the response likelihood value for the at least one potential responder being indicative of a likelihood that the at least one potential responder will respond to a future security incident.

2. The computing device of claim 1, wherein the physical access information comprises records associated with visits to one or more physical sites associated with the organization by one or more employees of the organization, the logical access information comprises records associated with virtual access to one or more computer systems associated with the organization by the one or more employees of the organization, the hybrid access information comprises records associated with virtual access to one or more mobile devices associated with the organization by the one or more employees of the organization, the availability information comprises records associated with meeting schedules of the one or more employees of the organization, and the historical interaction data comprises records associated with responses to previous security incidents by the one or more employees of the organization.

3. The computing device of claim 1, wherein determining that the security incident has occurred comprises determining that one or more causal events have occurred prior to an occurrence of a moment of impact.

4. The computing device of claim 1, wherein the predefined response template defines one or more necessary skills for a potential responder, one or more preferred skills for the potential responder, one or more necessary security clearances for the potential responder, one or more preferred security clearances for the potential responder, one or more necessary associations for the potential responder, and one or more preferred associations for the potential responder.

5. The computing device of claim 1, wherein utilizing the data platform to identify the one or more potential responders for the security incident based on the predefined response template comprises determining whether at least one potential responder is qualified to respond to the security incident.

6. The computing device of claim 1, wherein utilizing the data platform to identify the one or more potential responders for the security incident based on the predefined response template comprises determining, for at least one potential responder, a likelihood that the at least one potential responder will respond to the security incident.

7. The computing device of claim 1, wherein utilizing the data platform to identify the one or more potential responders for the security incident based on the predefined response template comprises determining, for at least one potential responder, an optimal way to contact the at least one potential responder.

8. The computing device of claim 7, wherein determining the optimal way to contact the at least one potential responder comprises generating a call tree for the at least one potential responder based on information obtained from the data platform.

9. The computing device of claim 1, wherein utilizing the data platform to identify the one or more potential responders for the security incident based on the predefined response template comprises:
   calculating, for each of the identified potential responders, a qualification score, a likelihood of response score, and a location confidence score;
   calculating, for each of the identified potential responders, an aggregate score based on the corresponding qualification score, likelihood of response score, and location confidence score; and
   ranking the identified potential responders based on the aggregate score calculated for each of the identified potential responders.

10. The computing device of claim 1, wherein the response likelihood value for the at least one potential responder of the one or more potential responders for the security incident identified based on the predefined response template is calculated further based on availability information and location information obtained from the data platform.

11. A method, comprising:
  determining, by a computing device, that a security incident has occurred, the security incident being a physical security incident or a cyber security incident;
  loading, by the computing device, a predefined response template, the predefined response template comprising a plurality of parameters for responding to the security incident;
  utilizing, by the computing device, a data platform to identify one or more potential responders for the security incident based on the predefined response template, wherein the data platform maintains physical access information, logical access information, hybrid access information, and availability information for an organization, and wherein the one or more potential responders are associated with the organization;
  contacting, by the computing device, the one or more potential responders for the security incident identified based on the predefined response template;
  monitoring, by the computing device, communications by the one or more potential responders for the security incident identified based on the predefined response template, the monitored communications being responsive to the contacting;
  updating, by the computing device, historical interaction data maintained by the data platform, based on the monitored communications by the one or more potential responders for the security incident identified based on the predefined response template; and
  calculating, by the computing device, based on the historical interaction data maintained by the data platform, a response likelihood value for at least one potential responder of the one or more potential responders for the security incident identified based on the predefined response template, the response likelihood value for the at least one potential responder being indicative of a likelihood that the at least one potential responder will respond to a future security incident.

12. The method of claim 11, wherein determining that the security incident has occurred comprises determining that one or more causal events have occurred prior to an occurrence of a moment of impact.

13. The method of claim 12, wherein the security incident is a denial of service attack against one or more computer systems of the organization, and wherein the one or more causal events comprise receiving one or more data packets before a disruption in service occurs for the one or more computer systems of the organization.

14. The method of claim 11, wherein determining that the security incident has occurred comprises classifying the security incident.

15. The method of claim 11, wherein the predefined response template defines one or more necessary skills for a potential responder, one or more preferred skills for the potential responder, one or more necessary security clearances for the potential responder, one or more preferred security clearances for the potential responder, one or more necessary associations for the potential responder, and one or more preferred associations for the potential responder.

16. The method of claim 11, wherein utilizing the data platform to identify the one or more potential responders for the security incident based on the predefined response template comprises determining whether at least one potential responder is qualified to respond to the security incident.

17. The method of claim 11, wherein utilizing the data platform to identify the one or more potential responders for the security incident based on the predefined response template comprises determining, for at least one potential responder, a likelihood that the at least one potential responder will respond to the security incident.

18. The method of claim 11, wherein utilizing the data platform to identify the one or more potential responders for the security incident based on the predefined response template comprises determining, for at least one potential responder, an optimal way to contact the at least one potential responder.

19. At least one non-transitory computer readable medium having instructions stored thereon that, when executed, cause at least one processor to:
  determine that a security incident has occurred, the security incident being a physical security incident or a cyber security incident;
  load a predefined response template, the predefined response template comprising a plurality of parameters for responding to the security incident;
  utilize a data platform to identify one or more potential responders for the security incident based on the predefined response template, wherein the data platform maintains physical access information, logical access information, hybrid access information, and availability information for an organization, and wherein the one or more potential responders are associated with the organization;
  contact the one or more potential responders for the security incident identified based on the predefined response template;
  monitor communications by the one or more potential responders for the security incident identified based on the predefined response template, the monitored communications being responsive to the contact;
  update historical interaction data maintained by the data platform, based on the monitored communications by the one or more potential responders for the security incident identified based on the predefined response template; and
  calculate, based on the historical interaction data maintained by the data platform, a response likelihood value for at least one potential responder of the one or more potential responders for the security incident identified based on the predefined response template, the response likelihood value for the at least one potential responder being indicative of a likelihood that the at least one potential responder will respond to a future security incident.

20. The at least one non-transitory computer readable medium of claim 19, wherein utilizing the data platform to identify the one or more potential responders for the security incident based on the predefined response template comprises:
  calculating, for each of the identified potential responders, a qualification score, a likelihood of response score, and a location confidence score;
  calculating, for each of the identified potential responders, an aggregate score based on the corresponding qualification score, likelihood of response score, and location confidence score; and ranking the identified potential responders based on the aggregate score calculated for each of the identified potential responders.

* * * * *